Figure 1:
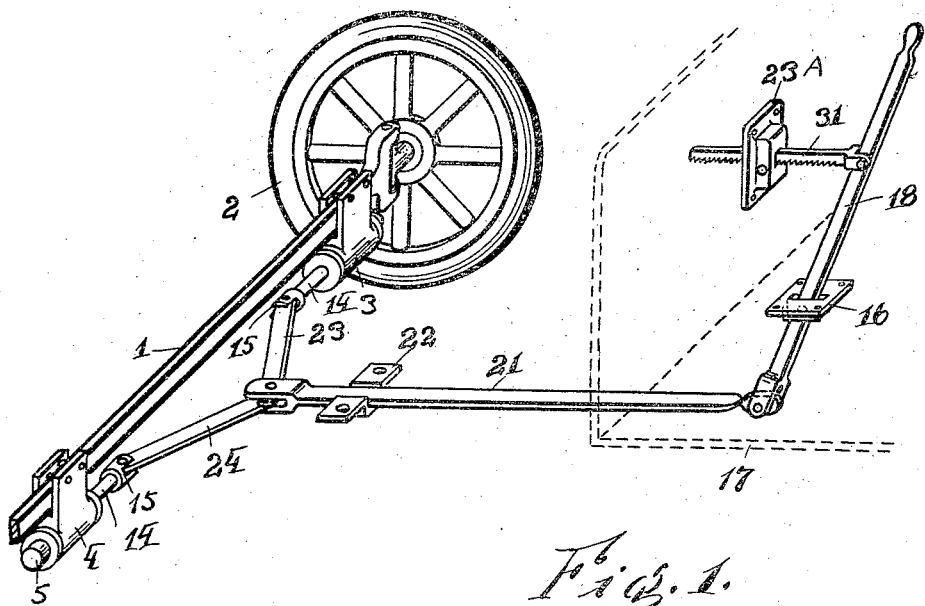

DE WITT C. SEE.
LOCKING DEVICE FOR AUTOMOBILES.
APPLICATION FILED MAR. 5, 1915.

1,206,038.

Patented Nov. 28, 1916.

WITNESSES:
Eric Ischinger.
Eleanor M. Corcoran.

INVENTOR.
D. Clinton See
BY Frank Keiffer
ATTORNEY

UNITED STATES PATENT OFFICE.

DE WITT CLINTON SEE, OF ROCHESTER, NEW YORK.

LOCKING DEVICE FOR AUTOMOBILES.

1,206,038.  Specification of Letters Patent.  Patented Nov. 28, 1916.

Application filed March 5, 1915. Serial No. 12,465.

*To all whom it may concern:*

Be it known that I, DE WITT CLINTON SEE, a citizen of the United States, residing at Rochester, in the county of Monroe and State of New York, have invented certain new and useful Improvements in Locking Devices for Automobiles, of which the following is a specification.

The object of this invention is to provide a new and useful locking device for locking the wheels of an automobile or other vehicle. This and other objects of the invention will be fully illustrated in the drawings, described in the specification and pointed out in the claims at the end thereof.

Figure 2:
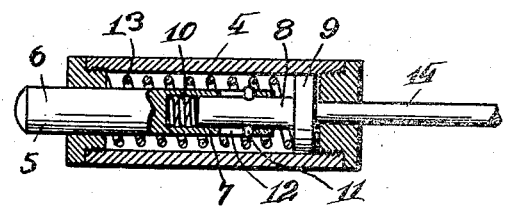
Figure 3:
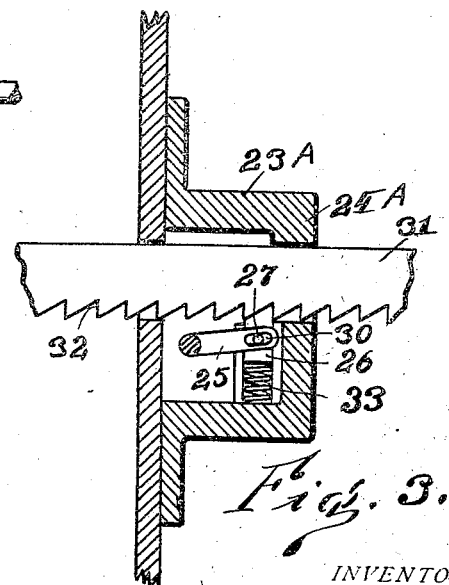

In the accompanying drawings, Figure 1 is a diagrammatic view of the locking device as it will appear when attached to the front wheels of an automobile. Fig. 2 is a sectional view of one of the locking bolts. Fig. 3 is a sectional view of the lock used in connection with the locking device.

In the several figures like reference numerals indicate like parts.

In the drawings 1 indicates the front axle of an automobile on which are supported in the usual manner the wheels 2. Rigidly fastened to this axle in any suitable manner near the outer ends thereof are the cylinders 3 and 4, inside of each of which are mounted to slide the locking pins or bolts 5. These bolts are made up of a pin 6 having a sleeve 7 on one end thereof into which projects the rod 8 having a shoulder 9 thereon. Interposed between the rod 8 and the end of the sleeve 7 is a compression spring 10 which normally forces the pin 6 into the position shown in Fig. 2. Passing through the rod 8 as shown in Fig. 2, is a small pin 11 which projects into suitable slots 12 provided in the sleeve 7 to guide and hold the pin 8 in its proper position. Interposed between the front end of the cylinder 4 and the shoulder 9 of the rod 8 is a compression spring 13 which normally holds the locking bolt 5 in its retracted position as shown in Fig. 2. Fastened to the rod 8 and forming a continuation thereof is the rod 14 having the forked end 15 on the outer end thereof.

Pivotally mounted on the bearing plate 16 fastened to the body of the automobile is the lever 18. The lower end of this lever is connected to the horizontal bar 21 which bar is mounted to slide in the stirrup or guide 22 provided on the frame of the car. The ends of the rods 14 are connected to the end of the horizontal bar 21 by the links 23 and 24.

When the driver of the car wishes to lock his car he operates the handle or lever 18 in the direction shown by the arrow in Fig. 1. This moves the bar 21 forward and forces the bolts 5 outward, projecting them into the path of the spokes of the wheels. If the driver wishes to unlock the car he moves the handle in the reverse direction which will cause the bolts to withdraw from the spokes and allow the wheels to turn.

To hold the bolts 5 in place between the spokes of the wheels I provide the following mechanism: Fastened to the dash board of the car is the lock 23^A. This lock consists of a casing 24^A in which any one of the well known type of locks may be mounted. Operated by this lock through the crank 25 which is keyed to the end of the barrel thereof is the locking bolt 26. This locking bolt has a pin 27 fastened thereon which engages with the slot 30 on the end of the crank 25. Passing through the lock casing 24^A is a bar 31 having ratchet teeth 32 cut in on the lower side thereof. The bolt 26 normally projects between these teeth and is held in engagement between them by the compression spring 33. The bar 31 is pivotally mounted on the lever or handle 18 with which it moves when the handle is operated. The ratchet teeth of the bar 31 and the locking bolt 26 are so formed that the lever and bar may be moved in but one direction without operating the lock 23^A. As shown in Figs. 1 and 3 the teeth of the bar 31, when moving to the right will depress the locking bolt 26 against the compression spring 33 and allow the bolt to spring back in the consecutive teeth as they pass the bolt which prevents the bar from moving in the reverse direction. To allow the bar 31 and lever 18 to move in the reverse direction the lock 23^A is operated which forces the crank 25 down and with it the bolt 26, thus withdrawing it from the path of the ratchet teeth so that the bar 31 is free to be moved back by the handle 18.

It happens sometimes that the wheels of the car are not parallel with the body of the car when it is desired to throw the bolts into locking position. In this case one of the bolts will encounter the spokes of its corresponding wheel before the other one will. For this purpose the end of each of the bolts is made yieldable as shown in Fig. 2, so that the bolts must be thrown their full length before the lock will be active. In case the wheels of the car are not parallel with the body of the car the bolt on one side may encounter a spoke of the wheel on that side by which its forward movement would be arrested. If the bolts were both rigid the forward movement of both might be arrested. Each bolt is, however, yieldingly mounted so that both can engage with their respective wheels simultaneously and so that the failure of the one bolt to engage will not prevent the other bolt from engaging. As shown in Fig. 2 the bolts 6 may be forced back until the shoulder 9 engages the end of the sleeve 7 when the forward movement of the rod 8 and bolts 6 will be simultaneous and positive.

It will be noted that this lock is absolutely positive and can be operated very conveniently by the driver of the car without leaving his seat and to prevent the bolts from marring the spokes of the wheels each of the bolts may be provided at its end with a soft rubber cap.

I claim:

1. In a locking device for automobiles the combination of an axle, wheels mounted to swing thereon, said wheels having spokes, a pair of cylinders rigidly mounted to said axle, a bolt yieldably mounted in each of said cylinders, a piston rod slidably connected to each of said bolts, a compression spring interposed between said bolt and said piston rod, means to move said piston rod in and out of said cylinders and move said bolts into and out of engagement between said spokes of said wheels.

2. In a locking device for automobiles the combination of an axle, wheels mounted to swing thereon, said wheels having spokes, a pair of cylinders rigidly mounted to said axle, a yieldable bolt mounted to slide in each of said cylinders, a piston rod slidably connected to each of said bolts, a compression spring interposed between said bolts and said piston rod, a shoulder on said piston rod, a compression spring mounted between said shoulder and the walls of said cylinders, means to move said piston rods in and out of said cylinders and move said bolts into and out of engagement between said spokes of said wheels.

In testimony whereof I affix my signature in presence of two witnesses.

D. CLINTON SEE.

Witnesses:
ERIC SCHINGER,
ELEANOR M. CORCORAN.